US012512519B2

(12) United States Patent
Knox et al.

(10) Patent No.: US 12,512,519 B2
(45) Date of Patent: Dec. 30, 2025

(54) SUBSEA ENERGY STORAGE AND METHOD OF USE

(71) Applicant: 1847 SUBSEA ENGINEERING LIMITED, Aberdeen (GB)

(72) Inventors: Richard Knox, Aberdeen (GB); Paul Slorach, Aberdeen (GB); Ross Mitchell, Aberdeen (GB); Mark Miller, Aberdeen (GB); Greg Carnie, Aberdeen (GB)

(73) Assignee: 1847 SUBSEA ENGINEERING LIMITED, Aberdeen (GB)

( * ) Notice: Subject to any disclaimer, the term of this patent is extended or adjusted under 35 U.S.C. 154(b) by 0 days.

(21) Appl. No.: 18/844,620

(22) PCT Filed: Mar. 10, 2023

(86) PCT No.: PCT/GB2023/050576
§ 371 (c)(1),
(2) Date: Sep. 6, 2024

(87) PCT Pub. No.: WO2023/170428
PCT Pub. Date: Sep. 14, 2023

(65) Prior Publication Data
US 2025/0183383 A1 Jun. 5, 2025

(30) Foreign Application Priority Data
Mar. 11, 2022 (GB) .................... 2203435

(51) Int. Cl.
*H01M 10/42* (2006.01)
*E21B 41/00* (2006.01)
(Continued)

(52) U.S. Cl.
CPC ....... *H01M 10/425* (2013.01); *E21B 41/0007* (2013.01); *F03B 13/14* (2013.01);
(Continued)

(58) Field of Classification Search
CPC .............. H01M 10/42; H01M 10/425; H01M 2010/4271; H01M 2010/4278;
(Continued)

(56) References Cited

U.S. PATENT DOCUMENTS

2014/0000904 A1   1/2014   Bennett et al.
2014/0042975 A1   2/2014   Miller et al.
2017/0271911 A1   9/2017   Chance et al.

FOREIGN PATENT DOCUMENTS

CN   115020904 A   9/2022
GB   2546251 A   7/2017
(Continued)

OTHER PUBLICATIONS

International Patent Application No. PCT/GB2023/050576, Search Report and Written Opinion dated Jul. 10, 2023, 8 pages.
(Continued)

*Primary Examiner* — Robert L Deberadinis
(74) *Attorney, Agent, or Firm* — Leber IP Law; Celia H. Leber

(57) ABSTRACT

The invention provides a modular system and method of use for the storage of energy subsea. The modular system comprises an energy management system and a rechargeable energy storage system. The energy management system is configured to control a transfer of electrical energy between the rechargeable energy storage system and at least one energy source and/or at least one electrical load.

24 Claims, 6 Drawing Sheets

(51) Int. Cl.
  *F03B 13/14* (2006.01)
  *F03B 13/26* (2006.01)
  *F03D 9/11* (2016.01)
  *H02J 3/32* (2006.01)
  *H02J 3/38* (2006.01)
  *H02J 7/00* (2006.01)

(52) U.S. Cl.
  CPC ............... *F03B 13/26* (2013.01); *F03D 9/11* (2016.05); *H02J 3/32* (2013.01); *H02J 3/38* (2013.01); *H02J 7/0068* (2013.01); *H01M 2010/4271* (2013.01); *H01M 2010/4278* (2013.01); *H01M 2220/10* (2013.01); *H02J 2300/28* (2020.01)

(58) Field of Classification Search
  CPC ....... H01M 2220/10; F03D 9/11; F03B 13/14; F03B 13/26; H02J 3/32; H02J 3/38; H02J 7/00; H02J 7/0068; H02J 2300/28; E21B 41/00; E21B 41/0007
  See application file for complete search history.

(56) References Cited

FOREIGN PATENT DOCUMENTS

| | | | |
|---|---|---|---|
| GB | 2588453 | A | 4/2021 |
| WO | 2014182880 | A1 | 11/2014 |
| WO | 2018089174 | A1 | 5/2018 |

OTHER PUBLICATIONS

Great Britain Patent Application No. GB2303569.4, Search Report dated Sep. 6, 2023, 2 pages.

SUBSEA ENERGY STORAGE AND METHOD OF USE

RELATED APPLICATIONS

This application is a national phase entry of International Patent Application No. PCT/GB2023/050576, filed Mar. 10, 2023, which claims priority from Great Britain Patent Application No. 2203435.9, filed Mar. 11, 2022, the entire disclosures of which are incorporated herein by reference.

The present invention relates to energy supply and storage and in particular to subsea energy supply and storage. Aspects of the invention relate to a system for offshore energy storage and management and methods of use.

BACKGROUND TO THE INVENTION

In recent times there has been a transition to the electrification of subsea processing for the oil and gas industry and offshore wind power production in order to reduce emissions.

Electrification of subsea facilities and equipment offers many opportunities to improve operational efficiency, reduce life-of-field capital, operating expenses, and reduce carbon footprint. However the move to electrification of subsea facilities and equipment presents a number of obstacles, particularly in subsea processing for the oil and gas industry and offshore wind power production, including more electric loads, higher power requirements, limited accessibility due to deeper water depth, and longer distances to transmit power supplies.

Conventionally offshore platforms generate power using large generators driven by diesel engines or gas turbines. This method of providing offshore electricity creates significant harmful emissions of greenhouse gases.

Due to the distance (often tens thousands of feet) between the operation platform and the subsea equipment it can be difficult and expensive to provide a safe and reliable supply of electricity to subsea equipment. A further issue is the requirement of long cables (umbilical) connections that are needed to connect the offshore platform to the subsea equipment. Often these cables may reach tens of kilometres in length resulting in large voltage drops which may result in damage to the remote subsea equipment and reduce power transfer efficiency.

Vessels in the offshore industry are required to meet high standards for environmental protection, limiting emissions and improving overall sustainability. To aid in complying with such strict regulations, vessels including Offshore Support Vessels (OSV), Service Operation Vessels (SOV) and Crew Transfer Vessels (CTV) are required to reduce their environmental footprint by using cleaner energy systems such as fully electric systems or electric hybrid systems.

There is a need for increased capacity of sustainable energy for offshore and subsea equipment and vessels in the oil and gas industry.

SUMMARY OF THE INVENTION

It is an object of an aspect of the present invention to obviate or at least mitigate the foregoing limitations of existing offshore electrical energy technology.

It is another object of an aspect of the present invention to provide a modular subsea energy storage system to provide electrical power for vessels, subsea equipment, vehicles and infrastructure.

It is a further object of an aspect of the present invention to provide a modular system with interchangeable components which may be configurable to different power requirements for specific applications.

It is another object of an aspect of the present invention to provide an energy storage system comprising an energy management system to maximise life of batteries, control electrical loads, and provide data acquisition to surface.

It is amongst the aims and objects of the invention to provide a method and/or apparatus for subsea power storage and/or management that allows easy deployment and maintenance, that may be powered by renewable or non-renewable energy.

In particular, one aim of an aspect of the invention is to provide a method and/or apparatus which may be configured or optimised to provide energy storage in proximity to the subsea location of use and thus minimise capital and operational expenditure.

Further aims of the invention will become apparent from the following description.

According to a first aspect of the invention, there is provided a modular system for the storage of energy subsea, the modular system comprising:
  an energy management system;
  a rechargeable energy storage system;
  wherein the energy management system is configured to control a transfer of electrical energy between the rechargeable energy storage system and at least one energy source and/or at least one electrical load.

The rechargeable energy storage system may be a subsea rechargeable energy storage system. One or more components or modules of the rechargeable energy storage system may be located subsea. One or more components or modules of the rechargeable energy storage system may be located on, at or above the surface of the water.

The rechargeable energy storage system may be a modular system. Preferably the rechargeable energy storage system is a rechargeable battery system. The rechargeable battery system may comprise at least one battery. The at least one battery may be located subsea. The rechargeable battery system may comprise a plurality of batteries. The rechargeable battery system may comprise two or more batteries. The number of batteries in the rechargeable battery system may depend on the desired energy capacity of the rechargeable battery system. The rechargeable battery system may comprise up to one hundred batteries. The rechargeable battery system may comprise more than one hundred batteries. The rechargeable battery system may comprise up to fifty batteries. The rechargeable battery system may comprise between ten and forty batteries. The rechargeable battery system may comprise thirty batteries. The capacity of the battery system may be up to 1 GWh. The capacity of the battery system may be in the range of 0.1 MWh to 1 GWh. The capacity of the battery system may be in the range of 0.5 MWh to 500 MWh. The capacity of the battery system may be up to 100 MWh. The capacity of the battery system may be up to 15 MWh. The rechargeable energy storage system may be based on lithium ion technology. The at least one battery may be a lithium ion battery. The at least one battery may be selected from the group comprising nickel-hydrogen, lithium-ion, lead-acid, and/or nickel-cadmium batteries. The two or more batteries may be arranged in a parallel or serial orientation.

Each battery may comprise at least one battery cell. Each battery may comprise two or more battery cells. Each battery may comprise a plurality of battery cells. Each battery may be a subsea retrievable unit. Two or more batteries may be arranged into a battery array. The battery array may be a subsea retrievable unit. Each battery may be provided in an individual battery enclosure. Two or more batteries may be provided in a battery enclosure. Each battery enclosure may be a subsea retrievable unit.

The modular system may comprise multiple components or modules. At least one of the components may be a subsea retrievable unit. The modular system may be a bidirectional power transfer system. The energy storage system may be a bidirectional power transfer system.

The energy management system may be configured to communicate with the energy storage system. The energy management system may be connected to the energy storage system. The energy management system may be connected to the at least one component of the energy storage system. The energy storage system may comprise the energy management system. The energy storage system may comprise at least one component or module of the energy management system. The energy management system may be a component of the energy storage system. The energy management system may be a modular system. The energy management system may be configured to direct power from at least one energy source and/or at least one electrical load to charge or partially charge the rechargeable energy storage system. The energy management system may be configured to transfer power from the rechargeable energy storage system to the at least one energy source and/or at least one electrical load. The energy management system may be configured to control a state of charge of the rechargeable battery system and/or at least one battery. The energy management system may be configured to control the transfer of power between at least one energy source and the battery system and/or at least one battery. The energy management system may be configured to control the transfer of power from at least one energy source to the battery system and/or at least one battery to charge the battery system and/or at least one battery. The energy management system may be configured to control the transfer of power from at least one electrical load to the battery system and/or at least one battery.

The energy management system may be configured to control the transfer of power from the battery system and/or at least one battery to the at least one energy source.

The energy management system may be configured to control the transfer of power from the battery system and/or at least one battery to at least one electrical load.

The modular system may comprise at least one energy source. The modular system may be configured to be connected or connectable to at least one energy source. The at least one energy source may be selected from the group comprising a renewable energy source, a non-renewable energy source, an electrical grid, at least one turbine, at least one vessel, at least one onshore substation, at least one offshore substation (topside or subsea), at least one wave energy converter, at least one tidal energy converter, at least one ocean current energy converter, at least one ocean thermal energy converter and/or at least one solar panel system. The at least one energy source may be located at surface (topside) or subsea. The at least one energy source may be a renewable energy source.

The modular system may comprise at least one electrical load. The modular system may be configured to be connected or connectable to at least one electrical load.

The at least one electrical load may be selected from the group comprising an electrical grid, a wind farm grid, underwater autonomous vehicles, remotely operated vehicle, electrolysers, hydrogen electrolysers, Christmas trees, well control packages, subsea hydraulic power units, subsea service modules, subsea pump and/or subsea test trees. The at least one vessel may be a crew transfer vessel, a service operation vessel and/or an offshore support vessel.

The modular system may comprise at least one module selected from the group comprising: at least one energy management system; at least one DC distribution board, at least one DC-DC convertor, at least one AC-DC convertor; at least one DC load distribution panel; at least one AC load distribution panel; and/or at least one battery.

The modular system may comprise a support frame. The modular system or at least one component of the modular system may be removably mounted on the support frame. The modular system or at least one modular component of the modular system may be removably mounted on the support frame. The energy storage system or at least one component of the modular energy storage system may be removably mounted on the support frame. The energy management system or at least one component of the energy management system may be removably mounted on the support frame. The modular system mounted on the support frame may be configured to be installed and/or secured to the seabed. The modular system mounted on the support frame may be configured to be suspended underwater above the seabed. The support frame may comprise a plurality of receptacles for mounting functional modules on the support frame. The functional modules are selected from the group comprising: at least one AC transformer, at least one AC supply distribution board, at least one AC-DC converter; at least one DC supply, at least one energy management system; at least one DC distribution board, at least one DC-DC convertor, at least one AC-DC convertor; at least one DC load distribution panel; at least one AC load distribution panel; and/or at least one battery.

The modular system may comprise a surface mountable first modular system and a subsea mountable second modular system. The modular system may comprise a surface mountable first modular system connected to a subsea mountable second modular system. The energy storage system may comprise a surface mountable first modular system and a subsea mountable second modular system. The surface mountable first modular system may comprise a first support frame comprising a plurality of receptacles for mounting the functional modules of the surface mountable first modular system. The surface mountable first modular system may comprise functional modules selected from the group comprising: at least one AC transformer, at least one AC supply distribution board, at least one AC-DC converter; at least one DC supply. The surface mountable first modular system may be configured to be connected to the at least one energy source. The surface mountable first modular system may be configured to be connected to the at least one energy source to convert alternating current provided by the at least one energy source to direct current.

The subsea mountable second modular system may comprise functional modules selected from the group comprising: at least one energy management system; at least one DC distribution board, at least one DC-DC convertor, at least one AC-DC convertor; at least one DC load distribution panel; at least one AC load distribution panel; and/or at least one battery. The subsea mountable second modular system may comprise a second support frame comprising a plurality of receptacles for mounting the functional modules of the subsea mountable second modular system. The subsea mountable second modular system may be connected to the surface mountable first modular system by at least one cable or umbilical. The subsea mountable second modular system may be configured to receive the direct current power supply provided by the surface mountable first modular system.

The energy management system may be configured to monitor the power resources of the subsea mountable second modular system and/or control the distribution of power between the at least one battery, DC load distribution panel and/or AC load distribution panel.

The support frame and components of the system may form an integrated assembly configured to be towed to an installation and/or lowered to the bed of the body of water. The support frame may be a sealed frame. The support frame may be a pressurised compartment which may be fluidly sealed. The support frame may have a port and/or hatch associated with each of the receptacles. Each component of the system may be removed or installed through at least one port and/or hatch on the frame. Each component of the system may be mounted into a receptacle by a quick connector.

The energy management system may be configured to collect and transmit data to surface. The energy management system may be configured to analyse data before it is transmitted to surface. The energy management system may be configured to collect or monitor data selected from the group comprising energy usage, individual battery status, individual battery health, temperature, operational data, toxic impurities, humidity, water ingress, internal pressure, capacity fade, power fade status of circuit breakers, on/off/tripped status of components, electrical parameters of distribution board or enclosures, weather conditions and/or environmental conditions. The energy management system may be an intelligent energy management system.

The energy management system may be configured to collect data relevant to the reliability of energy storage systems in extreme environments (e.g. subsea). The energy management system may be configured to collect data to understand the performance changes and state of health of one or more of the batteries over extended periods of time. The energy management system may be configured to measure and/or implement an active state of health management system for battery systems installed in hard to access locations such as the subsea environment. The energy management system may be configured to accurately predict and/or actively manage battery cell performance over extended durations in extreme environments. The energy management system may be configured to determine target reliability parameters for system design, including performance of specific battery cell chemistries and architecture used within energy storage technology. The energy management system may be configured to manage electrical efficiency to ensure that the internal power requirement does not excessively impact the power availability to the end user.

The energy management system may be configured to measure, monitor, track and/or quantify battery degradation. The energy management system may be configured to measure, monitor and/or quantify capacity fade, power fade and/or battery aging mechanisms to quantify battery degradation with respects to its nominal state. The energy management system may use capacity fade, power fade and/or battery aging mechanisms measurements to estimate the state of health of one or more of the batteries. The battery aging mechanisms may include conductivity loss, loss of lithium inventory and/or loss of active material. The energy management system may be configured to measure, monitor, track and/or quantify battery degradation in-situ or ex-situ. The tests performed to measure, monitor, track and/or quantify battery degradation may be non-invasive or invasive.

The energy management system may be configured to monitor and/or predict future environmental conditions. The energy management system may be configured to monitor and/or predict metocean, wind and/or solar conditions. The energy management system may be configured to provide a demand response requirement to avoid and/or minimise curtailment. The energy management system may be configured to maximise the ability of the storage system to capture and later deliver available resource.

The ability of the energy management system to track and/or predict the aging process of one or more batteries will greatly increase the battery life by actively altering the charge/discharge allowances.

The energy management system may be configured to identify or study trends and patterns on power requirement. The energy management system may process one or more key indicators and transmit data to surface and/or to a base. Transmitted data may allow for a model or digital twin to be established using minimal parameters. The model or digital twin may allow for both in-situ and ex-situ measurements, monitoring, tracking and/or quantification to be applied and processed topside. The energy management system may utilise data from the model or digital twin to increase or improve the performance or state of health of one or more of the batteries.

The system may be an autonomous system or a semi-autonomous system. The system may be an automated system or a semi-automated system. The system may be controlled by a user remotely. The energy management system may be an autonomous system or a semi-autonomous intelligent energy management system.

In this context, subsea means the modular system or at least one component or module of the modular system is located underwater or under the surface of a body of water such as the sea. The modular system is designed for the storage and/or distribution of energy underwater or under the surface of the sea.

According to a second aspect of the invention, there is provided a modular system for the storage of energy subsea, the modular system comprising:
 an energy management system;
 a first modular apparatus configured to be connected to at least one energy source
 a second modular apparatus configured to be installed subsea;
 wherein the second modular apparatus comprises rechargeable energy storage system;
 wherein the first modular apparatus is configured to transfer power from the at least one energy source to the second modular apparatus;
 wherein the energy management system is configured to control the transfer of electrical energy between the rechargeable energy storage system and at least one energy source and/or at least one electrical load.

The first modular apparatus may be mountable to the at least one energy source at, above or on the surface of a body of water or subsea. Preferably the first modular apparatus is a surface mountable first modular system.

The first modular apparatus may comprise a first support frame comprising a plurality of receptacles for mounting the functional modules of the surface mountable first modular system. The surface mountable first modular system may comprise functional modules selected from the group comprising: at least one AC transformer, at least one AC supply distribution board, at least one AC-DC converter; at least one DC supply. The first modular apparatus may be configured to be connected to the at least one energy source to convert alternating current provided by the at least one energy source to direct current. The first modular apparatus may be designed to be mounted to structures or apparatus of existing energy sources such as wind turbines to retrofit these installations.

The second modular apparatus may be configured to be installed and/or secured to a seabed. The second modular apparatus may be configured to be installed and/or secured on a bed of a body of water. The second modular apparatus may be configured to be suspended underwater above the seabed.

The second modular apparatus may comprise functional modules selected from the group comprising: at least one energy management system; at least one DC distribution board, at least one DC-DC convertor, at least one AC-DC convertor; at least one DC load distribution panel; at least one AC load distribution panel; and/or at least one battery. The subsea mountable second modular system may comprise a second support frame comprising a plurality of receptacles for mounting the functional modules of the subsea mountable second modular system. The second modular apparatus may be a subsea mountable second modular system. The second modular apparatus may be connected to the first modular apparatus by at least one cable or umbilical. The second modular apparatus may be configured to receive the direct current power supply provided by the first modular apparatus.

Embodiments of the second aspect of the invention may include one or more features of the first aspect of the invention or its embodiments, or vice versa.

According to a third aspect of the invention, there is provided a method of storing energy subsea, the method comprising:
providing a modular subsea energy storage system, the modular system comprising:
an energy management system; and
a rechargeable energy storage system;
transferring electrical energy from at least one energy source and/or at least one electrical load to the rechargeable energy storage system.

The modular subsea energy storage system may be configured to be installed and/or secured to a seabed. The modular subsea energy storage system may be configured to be installed and/or secured on a bed of a body of water. The modular subsea energy storage system be configured to be suspended underwater above the seabed.

The method may comprise transferring electrical energy from the at least one energy source and/or at least one electrical load to the rechargeable energy storage system to charge or partially charge the rechargeable energy storage system.

The method may comprise managing the transfer of electrical energy from the rechargeable energy storage system to at least one energy source and/or at least one electrical load.

The method may comprise controlling the transfer of electrical energy between the rechargeable energy storage system and at least one energy source and/or at least one electrical load based on operation schedule, maintenance work, installation work, electrical load power requirements, energy source power requirements; weather conditions and/or predicted weather conditions.

The method may comprise collecting and/or transmitting data to surface. The method may comprise analyse data before it is transmitted to surface. The method may comprise collecting or monitoring data selected from the group comprising energy usage, individual battery status, individual battery health, temperature, operational data, toxic impurities, humidity, water ingress, internal pressure, capacity fade, power fade status of circuit breakers, on/off/tripped status of components, electrical parameters of distribution board or enclosures, weather conditions and/or environmental conditions. The method may comprise collecting data relevant to the reliability of energy storage systems in extreme environments (e.g. subsea). The method may comprise collecting data to understand the performance changes and state of health of one or more of the batteries over extended periods of time. The method may comprise measuring and/or implementing an active state of health management system for battery systems installed in hard to access locations such as the subsea environment. The method may comprise predicting and/or actively managing battery cell performance over extended durations in extreme environments. The method may comprise obtaining or monitoring target reliability parameters for system design, including performance of specific battery cell chemistries and architecture used within energy storage technology. The method may comprise managing electrical efficiency to ensure that the internal power requirement does not excessively impact the power availability to the end user. The method may comprise measuring, monitoring, tracking and/or quantifying battery degradation. The method may comprise measuring, monitoring and/or quantifying capacity fade, power fade and/or battery aging mechanisms to quantify battery degradation with respects to its nominal state. The method may comprise estimating the state of health of one or more of the batteries. The method may comprise monitoring and/or predicting future environmental conditions. The method may comprise monitoring and/or predicting metocean, wind and/or solar conditions. The method may comprise identifying or studying trends and patterns on power requirement. The method may comprise creating a model or digital twin based on collected data.

Embodiments of the third aspect of the invention may include one or more features of the first or second aspects of the invention or their embodiments, or vice versa.

According to a fourth aspect of the invention, there is provided a method of distributing power from a modular subsea energy storage system, the method comprising:
providing a modular subsea energy storage system, the modular subsea energy storage system comprising:
an energy management system; and
a rechargeable energy storage system;
transferring electrical energy between the rechargeable energy storage system and at least one energy source and/or at least one electrical load.

The modular subsea energy storage system may be configured to be installed and/or secured to a seabed. The modular subsea energy storage system may be configured to be installed and/or secured on a bed of a body of water. The modular subsea energy storage system be configured to be suspended underwater above the seabed.

Embodiments of the fourth aspect of the invention may include one or more features of the first to third aspects of the invention or their embodiments, or vice versa.

According to a fifth aspect of the invention, there is provided a method of servicing a modular subsea energy storage system comprising:
providing a modular system; the modular system comprising:
an energy management system; and
a rechargeable energy storage system;
accessing a modular component of the modular system;

releasing the modular component from the modular system.

The modular system may be configured to be installed and/or secured to a seabed. The modular system may be configured to be installed and/or secured on a bed of a body of water. The modular system be configured to be suspended underwater above the seabed.

The method may comprise installing a replacement modular component on or in the modular system. The modular system may comprise a support frame. The modular system or at least one component of the modular system may be removably mounted on the support frame. The modular system mounted on the support frame may be configured to be installed and/or secured to the seabed. The modular system mounted on the support frame may be configured to be suspended underwater above the seabed. The support frame may comprise a plurality of receptacles for mounting functional modules on the support frame. The functional modules are selected from the group comprising: at least one AC transformer, at least one AC supply distribution board, at least one AC-DC converter; at least one DC supply, at least one energy management system module; at least one DC distribution board, at least one DC-DC convertor, at least one AC-DC convertor; at least one DC load distribution panel; at least one AC load distribution panel; and/or at least one battery.

The support frame may be a sealed frame. The support frame may be a pressurised compartment which may be fluidly sealed. The support frame may have a port and/or hatch associated with each of the receptacles. Each component of the system may be removed or installed through at least one port and/or hatch on the frame. Each functional module (component) of the system may be mounted into a receptacle by a quick connector.

The method may comprise accessing a receptacle on the support frame. The method may comprise releasing a functional module from the receptacle. The method may comprise accessing a receptacle through a hatch or port positioned above or adjacent to the receptacle. The method may comprise releasing a functional module from the receptacle manually or via a control module. The method may comprise installing a functional module in the receptacle. The method may comprise installing a functional module in a previously vacant receptacle.

Embodiments of the fifth aspect of the invention may include one or more features of the first to fourth aspects of the invention or their embodiments, or vice versa.

According to a sixth aspect of the invention, there is provided a modular system for the storage of energy subsea, the modular system comprising:
 a support frame comprising a plurality of receptacles for mounting functional modules on the support frame;
 a plurality of functional modules comprising at least one energy management system and a plurality of rechargeable batteries.

Embodiments of the sixth aspect of the invention may include one or more features of the first to fifth aspects of the invention or their embodiments, or vice versa.

According to a seventh aspect of the invention, there is provided apparatus for the storage of energy at the bed a body of water, the apparatus comprising:
 a support frame comprising a plurality of receptacles for mounting functional modules on the support frame; and
 a plurality of functional modules comprising at least one energy management system and a plurality of rechargeable batteries;
 and wherein the support frame and plurality of functional modules form an integrated assembly configured to be towed to an installation and/or lowered to the bed of the body of water.

Embodiments of the seventh aspect of the invention may include one or more features of the first to sixth aspects of the invention or their embodiments, or vice versa. According to an eighth aspect of the invention, there is provided a method of storing and managing energy on the bed of a body of water using the apparatus according to the first, second, sixth or seventh aspect of the invention.

Embodiments of the eighth aspect of the invention may include one or more features of the first to seventh aspects of the invention or their embodiments, or vice versa.

According to a ninth aspect of the invention, there is provided a method of installing apparatus for the storage and management of energy on a bed of a body of water, the method comprising:
 providing an apparatus comprising an integrated assembly having support frame and a plurality of functional modules mounted on the support frame;
 wherein the plurality of functional modules comprises at least one energy management system and a plurality of rechargeable batteries;
 and wherein the support frame and plurality of functional modules form an integrated assembly configured to be towed to an installation and/or lowered to the bed of the body of water.

The method may comprise connecting the apparatus to at least one energy source. The at least one energy source may be located on the surface or subsea. The method may comprise connecting the apparatus to at least one energy source by at least one cable or umbilical. The method may comprise connecting the apparatus to at least one electrical load.

Embodiments of the ninth aspect of the invention may include one or more features of the first to eighth aspects of the invention or their embodiments, or vice versa.

According to a tenth aspect of the invention, there is provided a method of storing and managing energy on a bed of a body of water, the method comprising:
 providing an apparatus comprising an integrated assembly having support frame and a plurality of functional modules mounted on the support frame;
 wherein the plurality of functional modules comprises at least one energy management system and a plurality of rechargeable batteries;
 lowering the integrated assembly to the bed of the body of water and locating the apparatus on the seabed;
 operating the at least one energy management system to control a transfer of electrical energy between at least one of the rechargeable batteries and at least one energy source and/or at least one electrical load.

Embodiments of the tenth aspect of the invention may include one or more features of the first to ninth aspects of the invention or their embodiments, or vice versa.

According to an eleventh aspect of the invention, there is provided a modular system for the storage and/or distribution of energy subsea, the modular system comprising:
 at least one an energy management system;
 at least one rechargeable energy storage system;
 wherein the at least one energy management system is configured to control a transfer of electrical energy between the at least one rechargeable energy storage system and at least one energy source and/or at least one electrical load.

The modular system may comprise two or more rechargeable energy storage systems. The at least one an energy management system may be configured to control a transfer of electrical energy between the two or more rechargeable energy storage systems. The at least one an energy management system may be configured to control a transfer of electrical energy between the two or more rechargeable energy storage systems and at least one energy source and/or at least one electrical load Embodiments of the eleventh aspect of the invention may include one or more features of the first to tenth aspects of the invention or their embodiments, or vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1:
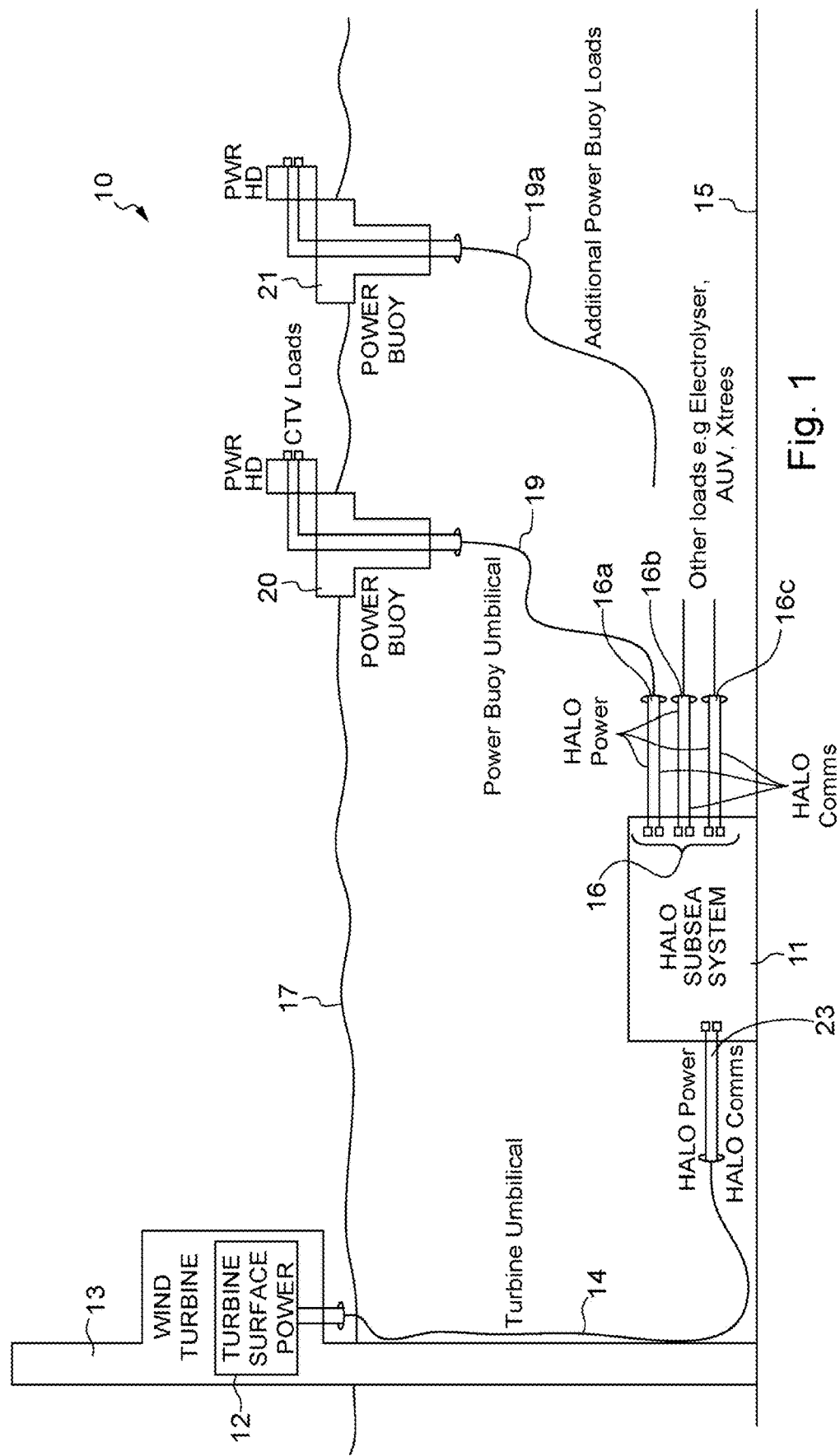
FIG. 1 is a diagram of a subsea energy storage and management system according to an embodiment of the invention.

FIG. 1 is a system 10 for storing and providing electrical power subsea. The system 10 comprises an energy storage system 11 which is in this example located on the seabed 15. It will be appreciated that in other examples the system or components of the system may be located underwater but suspended above the seabed. It will also be appreciated that components of the system may be located on, at or above the surface 17 of the sea (as described in relation to FIGS. 3A and 3B below).

The system 10 may comprise an energy source 12 which provides electric power to the energy storage system via umbilical cables 14. The energy source 12 may be a form of renewable energy such as wind, tidal, ocean current, wave energy, ocean thermal, or solar power. Additionally or alternatively, the energy may be provided by surface equipment such as an offshore platform, offshore sub-station (topside or subsea), a vessel, a turbine or an electrical grid. It will be appreciated that the system 10 may comprise two or more power sources located subsea, at or above surface, or a combination of subsea and surface energy sources. By surface it is meant equipment located at or above the surface of the water, this may include floating and/or fixed equipment. In the present example as shown in FIG. 1 the energy source is a wind turbine 13. By subsea it is meant under the surface of the water.

Figure 2:
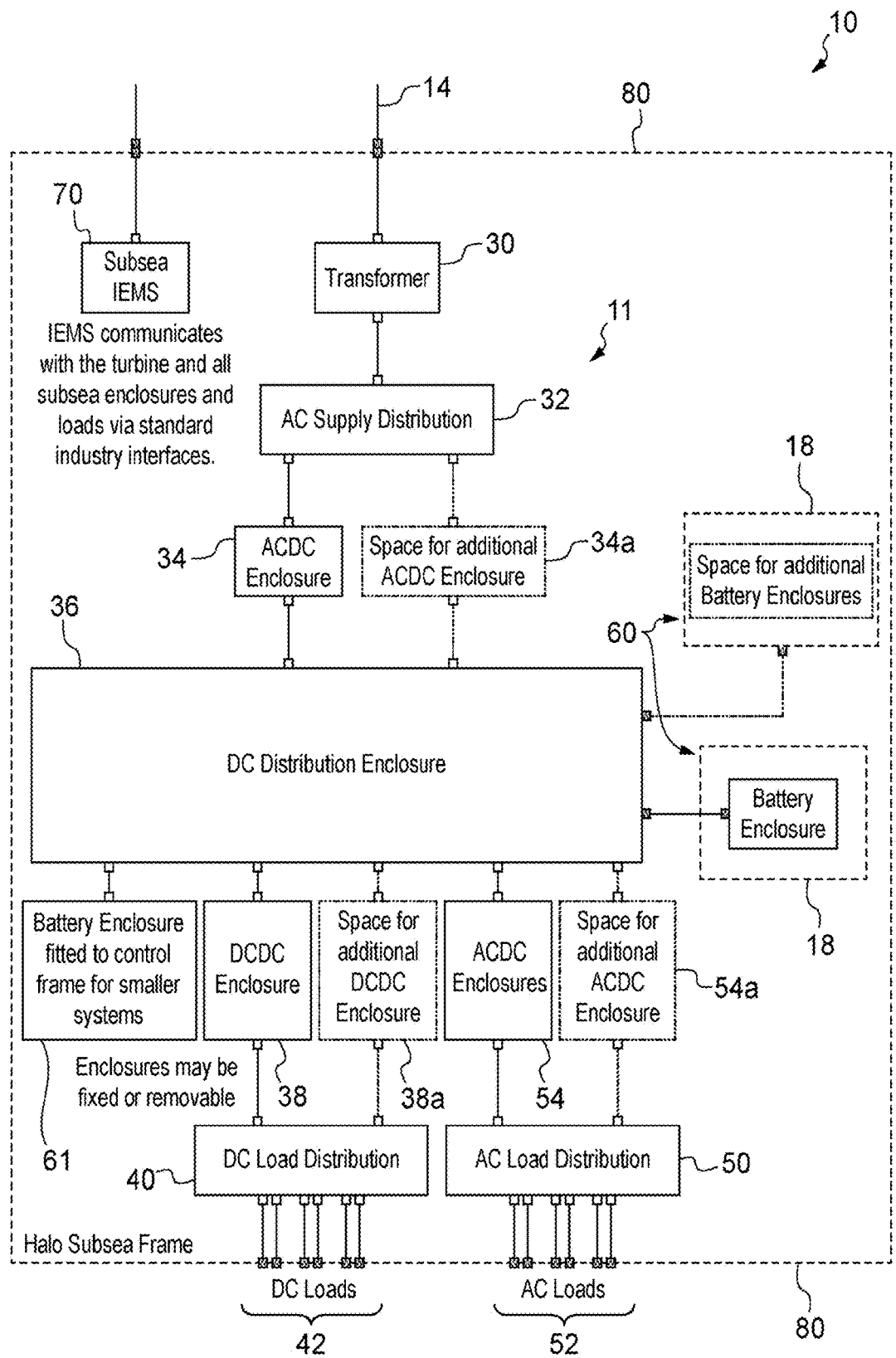
FIG. 2 is a schematic diagram showing components of a subsea energy storage and management system of FIG. 1.

The energy storage system 11 comprises at least one battery 18 (best shown in FIG. 2). The at least one battery 18 is housed in a battery enclosure. The energy storage system 11 has at least one electrical load connector 16. The electrical load connectors may be configured to act as inputs and/or outputs to the energy storage system. In this example three electrical load connectors 16a, 16b and 16c are shown. A power buoy 20 is connected to electrical load connector 16a via cable umbilical 19 and is configured to either act as an outlet and draw power from the energy storage system 11 or supply power to the energy storage system 11 depending on the mode of operation.

Although three electrical load connectors are shown in FIG. 1, it will be appreciated that the energy storage system 11 may comprise more or fewer than three electrical load connectors. It will also be appreciated that multiple devices may be connected to electrical load connectors (a second unconnected power buoy 21 is shown in FIG. 1).

In a battery charging mode the energy storage system 11 is configured to charge or at least partially charge the at least one battery 18. In this example power is supplied by the turbine 13 via the umbilical cable 14 to the energy storage system 11 via connectors 23. Additionally or alternatively in a battery charging mode power generated by the power buoy 20 may be transferred to the energy storage system 11 via the electrical load connectors 16a acting as an electrical inlet to charge the at least one battery 18. Additionally or alternatively the power buoy 20 may be connected to a surface vessel (not shown) and power may be transferred to the energy storage system 11 from the vessel via the power buoy 20 to charge the at least one battery 18.

In an energy production mode (battery discharging) the energy storage system 11 is configured to supply power from the at least one battery 18 to the electrical load connectors 16 to supply power to devices connected to the electrical load connectors 16. Additionally or alternatively in an energy production mode (battery discharging) the energy storage system 11 may be configured to supply power from the at least one battery 18 to the wind turbine to actuate the turbine when a black start of the turbine system is required. Additionally or alternatively in an energy production mode (battery discharging) the energy storage system 11 may be configured to supply power from the at least one battery 18 to provide power to a surface vessel via umbilical 19 and power buoy 20.

The system 10 comprises at least one energy management system 70, best shown in FIG. 2, which is configured to control the management of power in the energy storage system between a battery charging mode and a battery discharging mode. The at least one energy management system is configured to monitor the status of the at least one battery and when required, control the transfer of power to or from the at least one battery.

Although FIG. 1 shows a wind turbine 13 and a power buoy 20 connected to the energy storage system 11, it will be appreciated that a large range of different types of subsea and/or surface devices may be connected to the energy storage system to supply to and/or receive power from the energy storage system. Examples of devices that may be connected include wave generators, solar panel systems, electrolysers, AUVs, subsea pumps and/or Christmas trees.

FIG. 2 is schematic showing components of the energy storage system 11 of FIG. 1 for storing and providing electric power subsea. FIG. 2 also shows the energy management system 70 configured to monitor and/or control the energy storage system. The wind turbine 13 connected to the energy storage system 11 via umbilical 14 generates alternating current power. The energy storage system 11 comprises modules including in this example an AC transformer 30 to change the voltage in alternating current (AC) received from the wind turbine. An AC supply distribution board 32 is connected to the AC transformer 30 which is in turn connected to an AC-to-DC converter 34 to convert alternating current (AC) to direct current (DC). The output of the AC-to-DC converter 34 is connected to DC distribution board 36.

The system is configured to supply and receive DC and/or AC loads. For the DC loads, a DC-to-DC converter 38 is connected to the distribution board 36 to convert direct current from one voltage level to another. A DC load distribution panel 40 is connected to the DC-to-DC converter 38 and supplies a plurality of DC Load connectors 42 with DC power.

For AC loads, the energy storage system 11 comprises alternating current (AC) load connectors 52 connected to an AC load distribution panel 50 which is in turn connected to an AC-to-DC converter 54. The AC-to-DC converter 52 is connected to the distribution board 36 to convert alternating current (AC) to direct current (DC).

The energy storage system 11 comprises a battery system 60 comprising multiple modular rechargeable batteries 18 (only two are shown for conciseness). In this example the battery system has a combined capacity of up to 15 MWh. It will be appreciated the larger or smaller battery capacities may be used. The preference is that the battery capacity should be equivalent to the energy capacity generated by the connected wind turbine. The modular batteries 18 are connected to the DC distribution board 36. The number of modular batteries is dependent on load requirements. Optionally additional batteries can be added at a later point in time if the load requirement or electrical storage capacity requirement of the system change. Each individual battery housed in a battery enclosure may be recovered to surface for maintenance or replacement. Each battery is capable of being positioned and actuated independently of the others. Each battery is capable of being charged and/or discharged independently of the others.

The modular system 10 comprises an energy management system 70 which is configured to monitor the condition of batteries 18. It may measure battery parameters and states, such as state of charge, health and temperature. Each battery 18 may individually communicate with the energy management system to provide real-time data on the status of the battery. The energy management system may monitor and control the energy flow within the system including through the DC distribution board 36 and the battery system 60. The energy management system may be configured to collect and analyse energy data to allow efficient power resource management of the system.

The energy management system may control the charging and/or discharging of each of the batteries independently, a select group of batteries or all the batteries in the battery system to provide optimum charging or energy output. The energy management system may switch between battery charging and/or discharging depending on the power requirements of devices connected to the system.

All DC to DC converters are bi-directional. This may facilitate the modular batteries to be charged from the loads. All AC-DC converters are bi-directional. This may facilitate the batteries providing power to the energy source such as the turbine 13 and/or the turbine grid.

In use, in a battery charging mode AC power is provided from wind turbine 13 via umbilical 14. The AC power generated by the wind turbine 13 is converted to DC subsea via the AC-to-DC converter 34 as described above. The DC power is supplied to the distribution board 36. The energy management system 70 monitors the power resources of the system and controls the distribution of power between the modular batteries 18, DC load connectors 42 and/or AC load connectors 52. Optionally, in this example a power buoy 20 is connected to the DC load connectors 42 and the energy management system distributes power between the power buoy 20 and the modular batteries 18 to charge the modular batteries 18 depending on the power status of the modular batteries 18 and the power status of the power buoy 20. Additionally or alternatively a vessel may be connected to the power buoy 20 to provide power via the power buoy 20 to charge the modular batteries 18. This is controlled by the energy management system 70.

In a battery discharging mode (energy release mode) the energy management system 70 controls the discharge or release of power from the battery system 60 to the distribution board 36. The energy management system 70 may control the discharge or release of individual modular batteries, a select group of modular batteries or all of the modular batteries. The energy management system 70 controls the distribution of power between the DC load connectors 42, AC load connectors and/or energy source such as in this example the wind turbine. In this example, wind turbine 13 and power buoy 20 are connected to the system. The energy management system controls the distribution of power between the modular batteries and the wind turbine and/or the power buoy 20 depending on the power needs of each of the wind turbine (black start) the power buoy 20 and/or the status of the batteries 18.

The energy management system 70 may monitor an electrical grid connected to the energy source in this example a wind farm grid connected to the wind turbine. The energy management system 70 may control the transfer of power from the battery system 60 to the wind farm grid if wind power production levels fall or turbines are unable to operate.

Additionally or alternatively, the power buoy 20 may act as a connection hub for surface equipment or battery operated vessels (or electric hybrid vessels). The energy management system 70 may be in communication with the surface equipment or vessel via the power buoy 20 and control the infield charging of batteries on the vessel. The distribution of power may be dependent on the power levels of the battery system 60.

Other devices or systems may be connected to the system 10 including but not limited to AUVs, hydrogen electrolysers, electric Christmas trees, well control packages, subsea power units, subsea hydraulic power units, subsea service modules, subsea pumps and subsea test trees.

The energy storage system 11 is mounted in a frame 80. The frame 80 is secured to the seabed. The frame comprises a plurality of receptacles with each component of the modular system located in a separate receptacle. Each component of the system may be housed in an individual enclosure which is reversibly or removably mounted to the frame. The frame may have receptacles to locate duplicates or a plurality of each of the components of the system as redundancy or to improve the functionality of the system. As an example FIG. 2 shows duplicates of AC to DC converter 34, 34*a*, DC-to-DC converter 38, 38*a* and AC-to-DC converter 54, 54*a*. Not all duplicates of the components are shown in FIG. 2 for conciseness. It will be appreciated that depending on the size of the components the system may mounted be in two or more frames. Some of the components of the system may be mounted in separate frames.

Each component unit is mounted into a receptacle of the frame by a suitable quick connector which enables fast and reliable attachment/detachment of the component to/from the frame receptacle. The quick connecters may be mechanical connectors or in alternative embodiments, the quick connectors are preferably operable by fluid pressure. The quick connector may comprise upper and lower connector assemblies secured to the component (or component enclosure) and receptacle, respectively.

The battery system 60 has a plurality of receptacles or enclosures where each battery 18 is mounted in a separate receptacle on the frame. Each of the batteries has individual connections for monitoring, charging and discharging. In this example FIG. 2 shows a battery system having two batteries 18 for conciseness. Each of the batteries 18 is located in an individual receptacles or enclosure. However, additional receptacles or enclosure for batteries are provided should additional battery power capacity be required. It will be appreciated that more than two batteries may be located on the frame. It will be appreciated that one battery may be located on the frame. Optionally the system may have a battery enclosure 61 fitted to the frame for smaller energy storage systems.

The components of the energy storage system 11 including the batteries 18 are mounted in the receptacles and are electrically connected by a system of electrical conductors. The electrical conductors are configured for the transfer of electrical energy from each component unit to a common wet-mate connector. The wet-mate connector enables the apparatus to be connected to a single umbilical which may be connected to a turbine, turbine, grid, electrical sub-station and/or subsea or surface device.

The individual modular components of the modular energy storage system 11 are designed to be conveniently installable, easily replaceable and/or interchangeable modules in the system.

After assembly of the system in the frame apparatus at surface in a desired configuration, the frame is lowered to a seabed location on which it is installed. With the apparatus secured to the seabed, the wet-mate connections of the subsea umbilical are made up to connect the modular system 10 to, in this example, a surface wind turbine infrastructure.

After a period of use it may be necessary to remove, replace or service one or more components from the system. The configuration of the modular system facilitates access to the individual components of the system via ports or hatches positioned above each receptacle. A remotely operated vehicle (ROV) identifies the relevant port or hatch positioned above the component to be removed. The port or hatch is removed and the component is released from the receptacle either manually using the ROV or via a control signal (which may be activated by a remote signal received by the energy management system or a control module). The component to be removed can easily be extracted from the system via the hatch or port, for example by lifting it using the ROV or cable from surface, or by attaching it to a controllable buoyancy apparatus to allow it to be recovered to surface. A replacement (or additional) component may be easily installed in the apparatus by lowering from surface and locating it in the relevant receptable using the ROV. As discussed, the system may have duplicate or multiple components as redundancy to mitigate the replacement of components.

Advantageously, an individual component or module of the modular system may be removed and/or installed in the apparatus without disrupting the installation or operation or other components forming a part of the apparatus.

In alternative configurations, a number of energy storage systems 11 may be connected together to "daisy chain" the system 11 into a larger energy storage and management system. One or more energy management systems may control the transfer of power between the various connected energy storage systems 11*a*, 11*b* etc depending on the power requirements of each of the systems 11 and connected loads.

Figure 4:
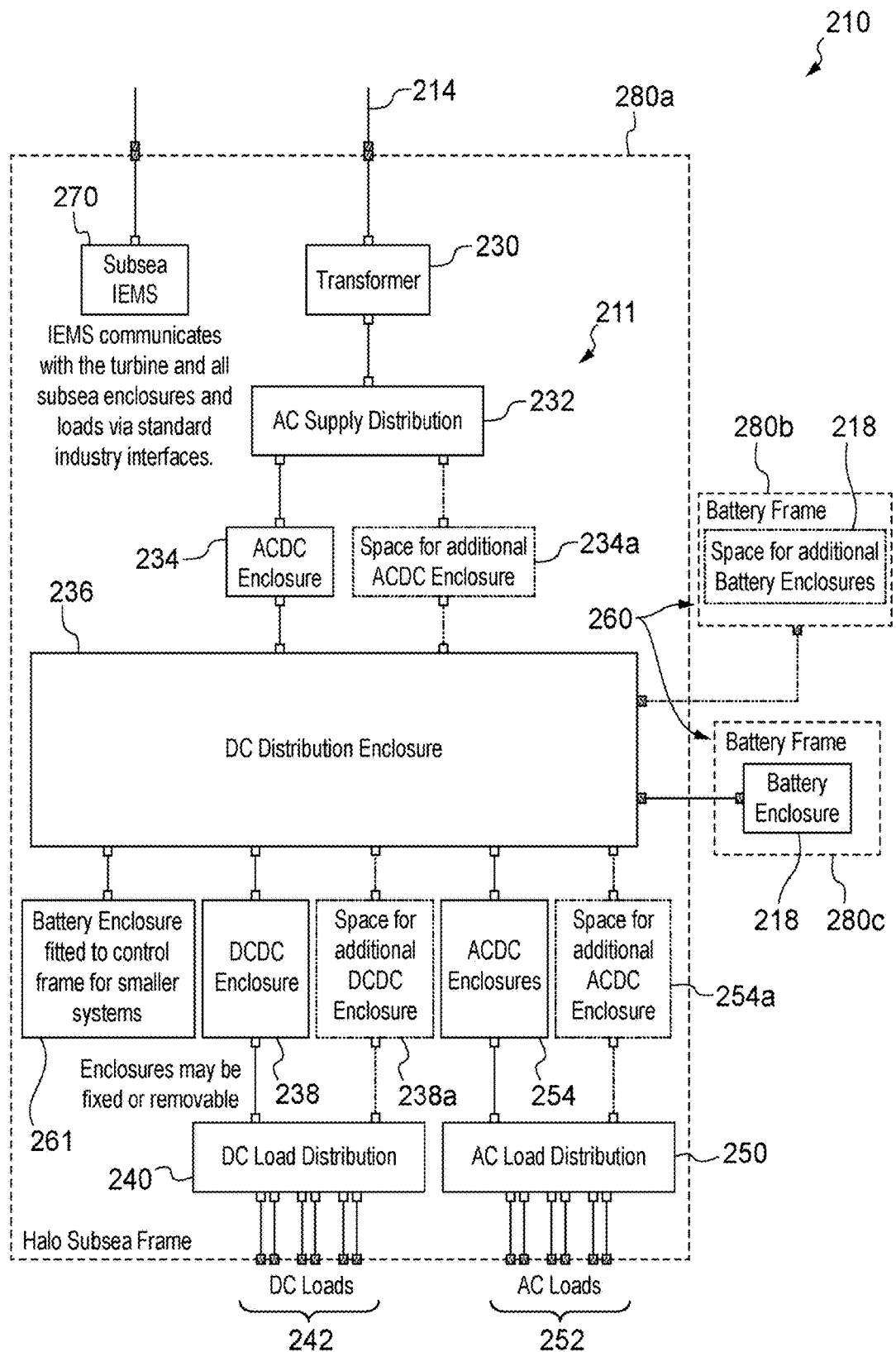
FIG. 4 is a schematic diagram showing components of the subsea energy storage and management system of FIG. 1 with batteries mounted in separate frames.

FIG. 4 show a modular system 210 comprising an energy storage system 211 and energy management system 270. The energy storage system 211 is an alternative arrangement of the modular system 11. The energy storage system 211 is similar to the system 11 of FIG. 2 and will be understood from the description of FIG. 2. However the modular system 211 has batteries 218 located in enclosures mounted in separate frame units 280*b* and 280*c* which are separate to the frame 280*a* which houses the other components of the energy storage system 211 and optionally energy management component 270.

Figure 3A:
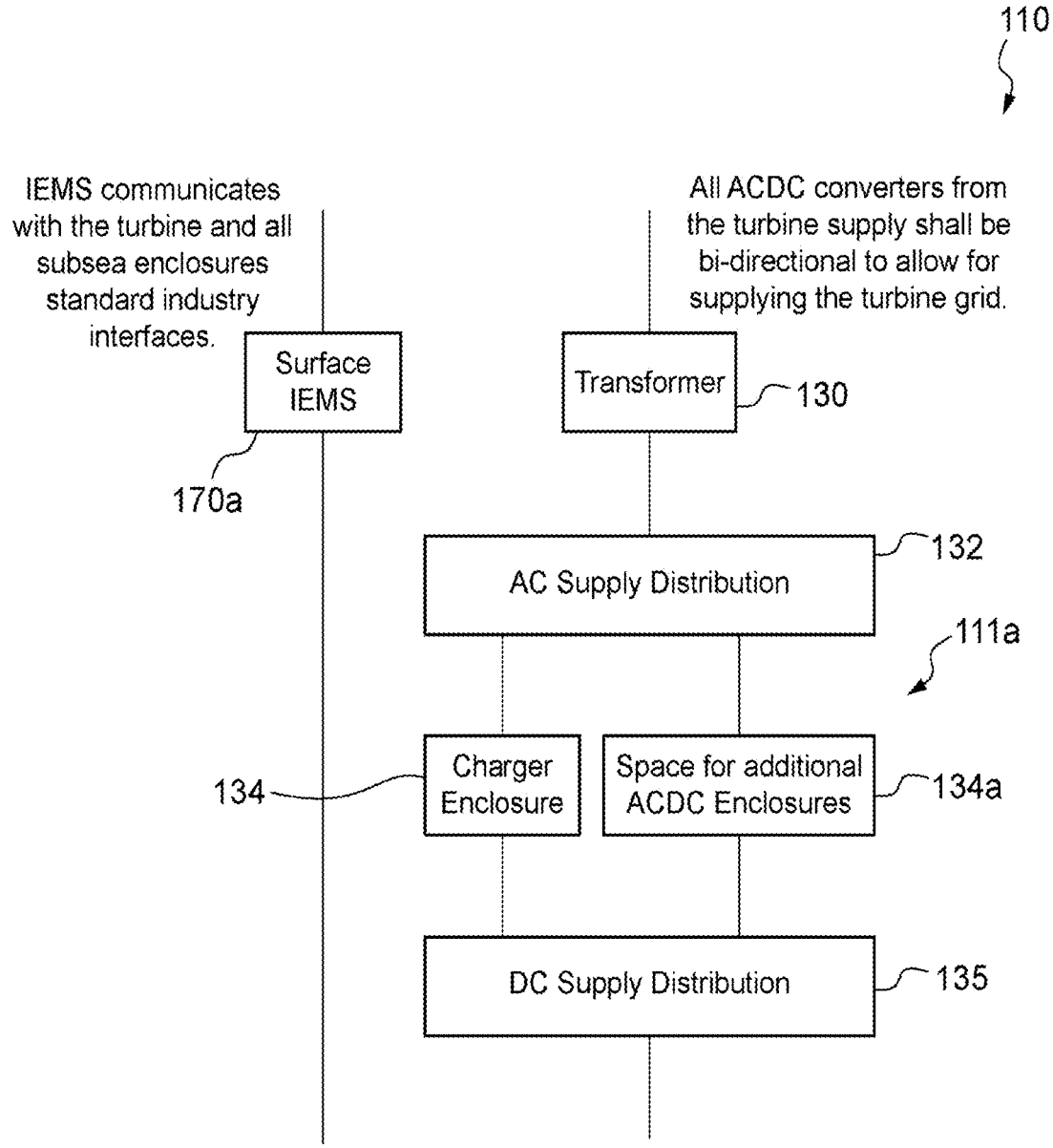
FIG. 3A is a schematic diagram showing a surface mountable module system of a subsea energy storage system and management system according to an embodiment of the invention.
Figure 3B:
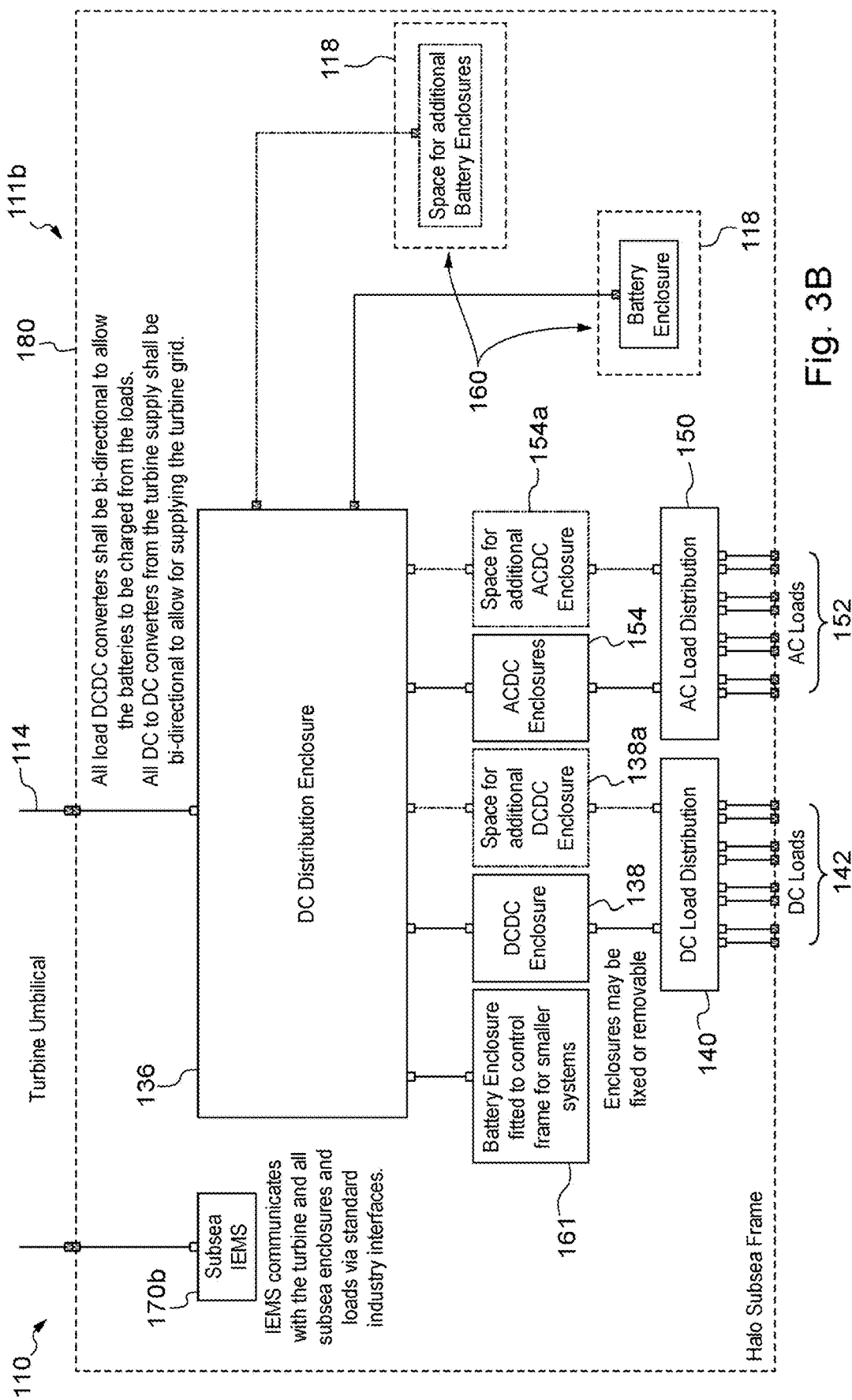
FIG. 3B is a schematic diagram showing subsea mountable module system of a subsea energy storage system and management system configured to be connected to the surface mountable module system of FIG. 3A.

FIGS. 3A and 3B show a modular system 110 for the storage of energy subsea which is similar to the modular system 10 of FIG. 2 and will be understood from the description of FIG. 2. However the modular system 110 comprises a surface modular system 111*a* shown in FIG. 3A and a subsea modular system 111*b* shown in FIG. 3B. The initial phase of converting alternating current generated by the wind turbine to direct current is performed at surface using the surface modular system 111*a* shown in FIG. 3A. The resulting direct current output is transferred to the subsea modular system 111*b* via an umbilical 114 shown in FIG. 3B.

FIG. 3A shows a first modular system which is a surface modular system 111*a* comprising the surface components of the energy storage system 111. In this example the first modular system comprises a component of the energy management system 170*a*. The system 111*a* comprises an AC transformer 130 connected to a wind turbine (not shown). The AC transformer 130 changes the voltage of the alternating current (AC) received from the wind turbine. An AC supply distribution board 132 is connected to the AC transformer 130 which is in turn connected to an AC-to-DC converter 134 and a DC supply distribution panel 135 to convert alternating current (AC) to direct current (DC). The surface modular system 111*a* is located at surface preferably as part of, or in close proximity to a wind turbine equipment. In the event that the wind turbine technology is being retrofitted and there is insufficient space at surface for the AC-DC conversion equipment then a subsea system as described in FIG. 2 may be used.

FIG. 3B shows a second modular system which is a subsea modular system 111*b* comprising subsea components of the energy storage system 111. The system 111*b* comprises a DC distribution board 136 for receiving direct current from the surface modular system 111*a* via umbilical 114.

The system is configured to supply and receive DC and/or AC loads. For the DC loads, a DC-to-DC converter 138 is connected to the distribution board 136 to convert direct current from one voltage level to another. A DC load distribution panel 140 is connected to the DC-to-DC converter 138 and supplies a plurality of DC Load connectors 142 with DC power.

For AC loads, the modular system 111*b* comprises alternating current (AC) load connectors 152 connected to an AC load distribution panel 150 which is in turn connected to an AC-to-DC converter 154. The AC-to-DC converter 152 is connected to the distribution board 136 to convert alternating current (AC) to direct current (DC).

The subsea modular system 111b comprises multiple modular rechargeable batteries 118 (only two are shown for conciseness). The modular batteries 118 are connected to the DC distribution board 136. The number of modular batteries is dependent on load requirements. Optionally additional batteries can be added at a later point in time if the load requirement or electrical storage capacity requirement of the system change. The individual batteries may be recovered to surface for maintenance or replacement. Each battery may individually communicate with the energy management system to provide real-time data on the status of the battery.

The subsea modular system 111b is mounted in a frame 180. In this example a component of the energy management system 170b is also optionally mounted in the frame. The frame 180 is secured to the seabed. The frame comprises a plurality of receptacles with each component of the modular system located in a separate receptacle. Each component may be housed in an individual enclosure which are reversibly or removably mounted to the frame. The frame may have receptacles to locate duplicates or a plurality of each of the components of the system as redundancy or to improve the functionality of the system. As an example FIGS. 3A and 3B show duplicates of AC-to-DC converter 134, 134a, DC-to-DC converter 138, 138a and AC-to-DC converter 154, 154a. Not all duplicates of the components are shown in FIG. 3B for conciseness.

Each component unit is mounted into a receptacle of the frame by a suitable quick connector which enables fast and reliable attachment/detachment of the component to/from the frame receptacle. The quick connecters may be mechanical connectors or in alternative embodiments, the quick connectors are preferably operable by fluid pressure. The quick connector may comprise upper and lower connector assemblies secured to the component (or enclosure) and receptacle, respectively. Optionally the system may have a battery enclosure 161 fitted to the frame for smaller energy storage systems.

The operation and benefits of the modular system 111 (surface modular system and subsea modular system 111b) are the same as the modular system 11 described in FIG. 2 and will be understood from the description of FIG. 2.

Figure 5:
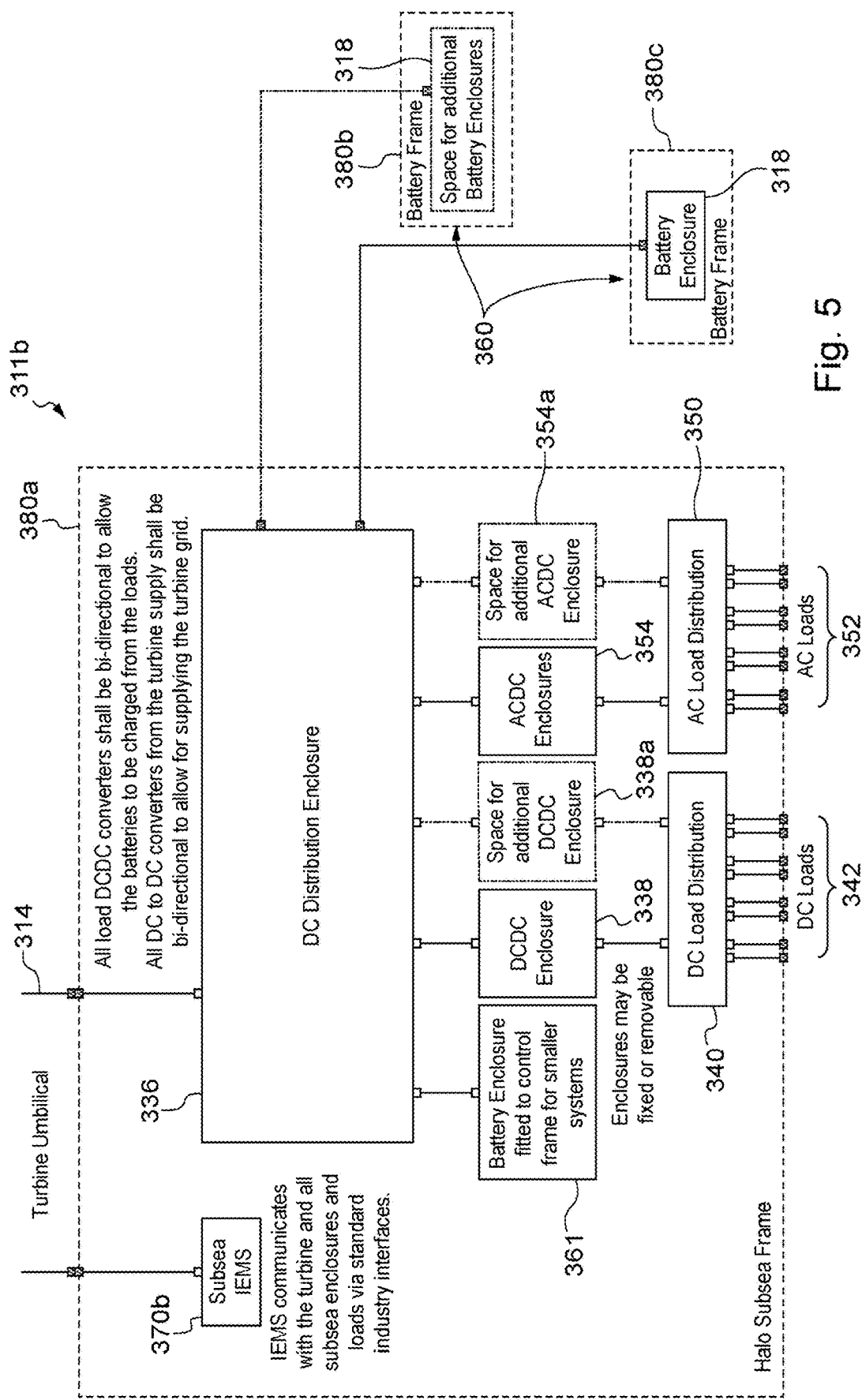
FIG. 5 is a schematic showing an alternative subsea mountable module system of a subsea energy storage system and management system according to an embodiment of the invention configured to be connected to the surface mountable module system of FIG. 3A, with batteries mounted in separate frames.

FIG. 5 show a modular system which is a subsea modular system 311b comprising subsea components of the energy storage system 311 for the storage of energy subsea which is similar to the modular system 111b of FIG. 3B and will be understood from the description of FIG. 3B. However the modular system 311b has batteries 318 located in enclosures reversibly or removably mounted on separate frame units 380b and 380c which are separate to the frame 380a which houses the other components of the subsea modular system 311b. In this example a component of the energy management system 370b is also optionally mounted in the frame.

By providing a modular subsea energy storage system comprising an energy management system the modular batteries may be closely monitored to assess their health and to maximise the life span of the batteries. The energy management system may also control the distribution of energy throughout the system across multiple devices to control loads and facilitate efficient charging and/or supply stored energy for wide range of subsea equipment and applications.

The energy management system described in the above examples may control drawing or taking energy from energy sources such as windfarm turbines, windfarm inter-array cables or junction boxes, offshore sub-stations (topside and subsea), wave energy converters, tidal energy converters, ocean current energy converters, ocean thermal energy converters, an electrical grid, vessels and/or connected surface and/or subsea equipment to recharge or partially recharge the battery system. This electrical power is stored subsea in the energy storage system for use when required. The stored energy may be used to supply various offshore loads, vessels and/or return power to the energy source(s) when required.

The energy management system may collect and optionally analyse data. The energy management system may provide the data to surface for optional further analysis. The energy management system may collect or have access to data on the operation of the energy source. As an example if the at least one energy source is a wind turbine the energy management system may use actual or predicted weather conditions in order to predict power demands. The energy management system may be configured to switch to battery charging mode if the weather forecast predicts adverse surface weather which impacts the ability of the wind turbine to function. This may facilitate the batteries in the energy storage system to fully charge. If the wind turbine is shut down to prevent unnecessary strain and damage on the turbine due to the adverse weather the energy management system may direct power from the batteries in the energy storage system to the turbine grid to maintain power levels in the grid.

Another example where power from the energy storage system may be required is during scheduled supply, maintenance, installation and/or repair work at surface by electrically operated vessels. Ahead of the scheduled supply, maintenance, installation and/or repair work the energy management system of the energy storage system may control the system to switch to battery charging mode to ensure that the batteries in the energy storage system are fully charged and power is available for vessels.

The energy management system may control the switching of the energy storage system to a battery charging mode when a vessel has a surplus of electrical power to facilitate the recharging or partially recharging of batteries in the energy storage system.

The invention provides a modular system and method of use for the storage of energy subsea. The modular system may comprise an energy management system and a rechargeable energy storage system. The energy management system may be configured to control a transfer of electrical energy between the rechargeable energy storage system and at least one energy source and/or at least one electrical load.

The provision of a subsea modular system installed on a seabed provides operational flexibility and allows the system to be situated in a wide range of locations close to where the energy demand is greatest without limitations on space. Furthermore by placing the system in offshore locations close to the energy demand, the need for expensive and lengthy power umbilicals may also be reduced and power losses through lengthy power umbilicals mitigated.

Embodiments of the present invention may allow the system to be designed and assembled according to the power requirements of the specific location in which it is to be deployed. It may be designed and assembled according to the application of the technology. It may also be designed and assembled according to the requirement of systems (surface and/or subsea) which are providing power to charge the energy storage system and/or the systems (surface and/or subsea) which the energy storage system is supplying stored energy.

The designed and assembled of the modular system and apparatus may be adjusted or reconfigured in-situ while it is secured to the seabed subsea. The components of the modular system are interchangeable. The apparatus forms an integrated modular assembly comprising the frame structure and the components of the system. The modular nature of the system may allow for changing loads and cost-effective maintenance.

Aspects of the present invention may complement existing methods of delivering power offshore by providing an easy-to-install means of storing energy subsea and overcoming intermittency of renewable resources. As an example, the present invention may be used in conjunction with wave/tidal/ocean current/ocean thermal energy generation for remote subsea tie-backs or with floating/fixed offshore wind turbines to power subsea equipment such as pumps. Aspects of the present invention may also compliment and/or replace diesel/gas turbines on offshore platform electrification.

Aspects of the present invention may provide a high energy storage subsea. By providing the system subsea it mitigates the requirement for space on existing surface equipment such as windfarm assets for retrofit.

Embodiments of the present invention may facilitate the monitoring of battery performance of the subsea energy storage system including monitoring the health and functionality of the batteries in the energy storage system. By providing an autonomous intelligent energy management system the life span of the batteries may be maximised. Data acquisition on the system including operational data may be provided to surface.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers. Furthermore, relative terms such as "up", "down", "above", "below", "top", "bottom", "upper", "lower", "upward", "downward", "horizontal", "vertical", "and the like are used herein to indicate directions and locations as they apply to the appended drawings and will not be construed as limiting the invention and features thereof to particular arrangements or orientations. Likewise, the term "outlet" or "output" shall be construed as being a location or connection type which, dependent on the direction of power, signal or charge may also serve as an "inlet" or "input", and vice versa.

Various modifications to the above-described embodiments may be made within the scope of the invention, and the invention extends to combinations of features other than those expressly claimed herein.

The invention claimed is:

1. A modular system for the storage of energy subsea, the modular system comprising:
an energy management system; and
a rechargeable subsea energy storage system;
wherein the energy management system is configured to control a transfer of electrical energy between the rechargeable energy storage system and at least one energy source and/or at least one electrical load;
wherein the modular system is a bidirectional power transfer system.

2. The modular system according to claim 1 wherein the rechargeable energy storage system is a rechargeable battery system comprising at least one battery.

3. The modular system according to claim 1 wherein at least one component of the rechargeable energy storage system is a subsea retrievable unit.

4. The modular system according to claim 1 wherein the energy management system is configured to control a transfer power between the at least one energy source and/or the at least one electrical load to the rechargeable energy storage system to charge or partially charge the rechargeable energy storage system.

5. The modular system according to claim 1 wherein the energy management system is configured to control a transfer power between the rechargeable energy storage system and the at least one energy source and/or the at least one electrical load.

6. The modular system according to claim 1 wherein the energy management system is configured to control a state of charge of the rechargeable energy storage system.

7. The modular system according to claim 1 wherein the at least one energy source is selected from the group consisting of a renewable energy source, a non-renewable energy source, an electrical grid, at least one turbine, at least one vessel, at least one onshore substation, at least one offshore substation, at least one wave energy converter, at least one tidal energy converter, at least one ocean current energy converter, at least one ocean thermal energy converter and at least one solar panel system.

8. The modular system according to claim 1 wherein the at least one energy source is located at, above and/or below the surface of the sea.

9. The modular system according to claim 1 wherein the at least one electrical load is selected from the group consisting of an electrical grid, a wind farm grid, underwater autonomous vehicles, vessel, remotely operated vehicle, electrolysers, hydrogen electrolysers, Christmas trees, well control packages, subsea hydraulic power units, subsea service modules, subsea pump and subsea test trees.

10. The modular system according to claim 1 wherein the system comprises at least one functional module selected from the group consisting of: at least one AC transformer, at least one AC supply distribution board, at least one AC-DC converter, at least one DC supply, at least one energy management system, at least one DC distribution board, at least one DC-DC convertor, at least one AC-DC convertor, at least one DC load distribution panel, at least one AC load distribution panel, and at least one battery.

11. The modular system according to claim 1 wherein the system comprises a surface mountable first modular system and a subsea mountable second modular system.

12. The modular system according to claim 11 wherein the surface mountable first modular system is configured to be connected to the at least one energy source to convert alternating current provided by the at least one energy source to direct current.

13. The modular system according to claim 11 wherein the subsea mountable second modular system is configured to receive direct current power supply provided by the surface mountable first modular system.

14. The modular system according to claim 1 wherein the modular system comprises a support frame, wherein the modular system or at least one component of the modular system is removably mounted on or to the support frame.

15. The modular system according to claim 14 wherein the modular system mounted on the support frame is configured to be installed and/or secured to the seabed.

16. The modular system according to claim 1 wherein the energy management system is configured to collect and/or transmit data to surface.

17. The modular system according to claim 1 wherein the energy management system is configured to collect and/or monitor data selected from the group consisting of energy usage, individual battery status, individual battery health, temperature, operational data, toxic impurities, humidity, water ingress, internal pressure, capacity fade, power fade status of circuit breakers, on/off/tripped status of components, electrical parameters of a distribution board or an enclosure, weather conditions, and environmental conditions.

18. The modular system according to claim 1 wherein the system is an autonomous system or a semi-autonomous system.

19. A method of storing energy subsea, the method comprising:
providing a modular subsea energy storage system, the system comprising:
an energy management system; and
a rechargeable subsea energy storage system; and
controlling a bidirectional transfer of electrical energy between the rechargeable energy storage system and at least one energy source and/or at least one electrical load.

20. The method according to claim 19 comprising transferring electrical energy from the at least one energy source and/or the at least one electrical load to the rechargeable energy storage system to charge or partially charge the rechargeable energy storage system.

21. The method according to claim 19 comprising managing the transfer of electrical energy from the rechargeable energy storage system to the at least one energy source and/or the at least one electrical load.

22. The method according to claim 19 comprising controlling the transfer of electrical energy between the rechargeable energy storage system and the at least one energy source and/or the at least one electrical load based on operation schedule, maintenance work, installation work, electrical load power requirements, energy source power requirements; environmental conditions, weather conditions and/or predicted weather conditions.

23. A method of servicing a modular subsea energy storage system comprising:
providing a modular system; the modular system comprising:
an energy management system; and
a rechargeable subsea energy storage system;
wherein the energy management system is configured to control a bi-directional transfer of electrical energy between the rechargeable energy storage system and at least one energy source and/or at least one electrical load;
accessing a modular component of the modular system;
releasing the modular component from the modular system.

24. The method according to claim 23 comprising installing a replacement modular component on or in the modular system.

* * * * *